Sept. 9, 1947.                D. G. C. LUCK                2,427,219
                       RADIO POSITION INDICATING SYSTEM
                           Filed Nov. 2, 1942            4 Sheets-Sheet 1

Inventor
DAVID G. C. LUCK
Attorney

Sept. 9, 1947.  D. G. C. LUCK  2,427,219
RADIO POSITION INDICATING SYSTEM
Filed Nov. 2, 1942  4 Sheets-Sheet 2

Inventor
DAVID G. C. LUCK
By
CD. Puskas
Attorney

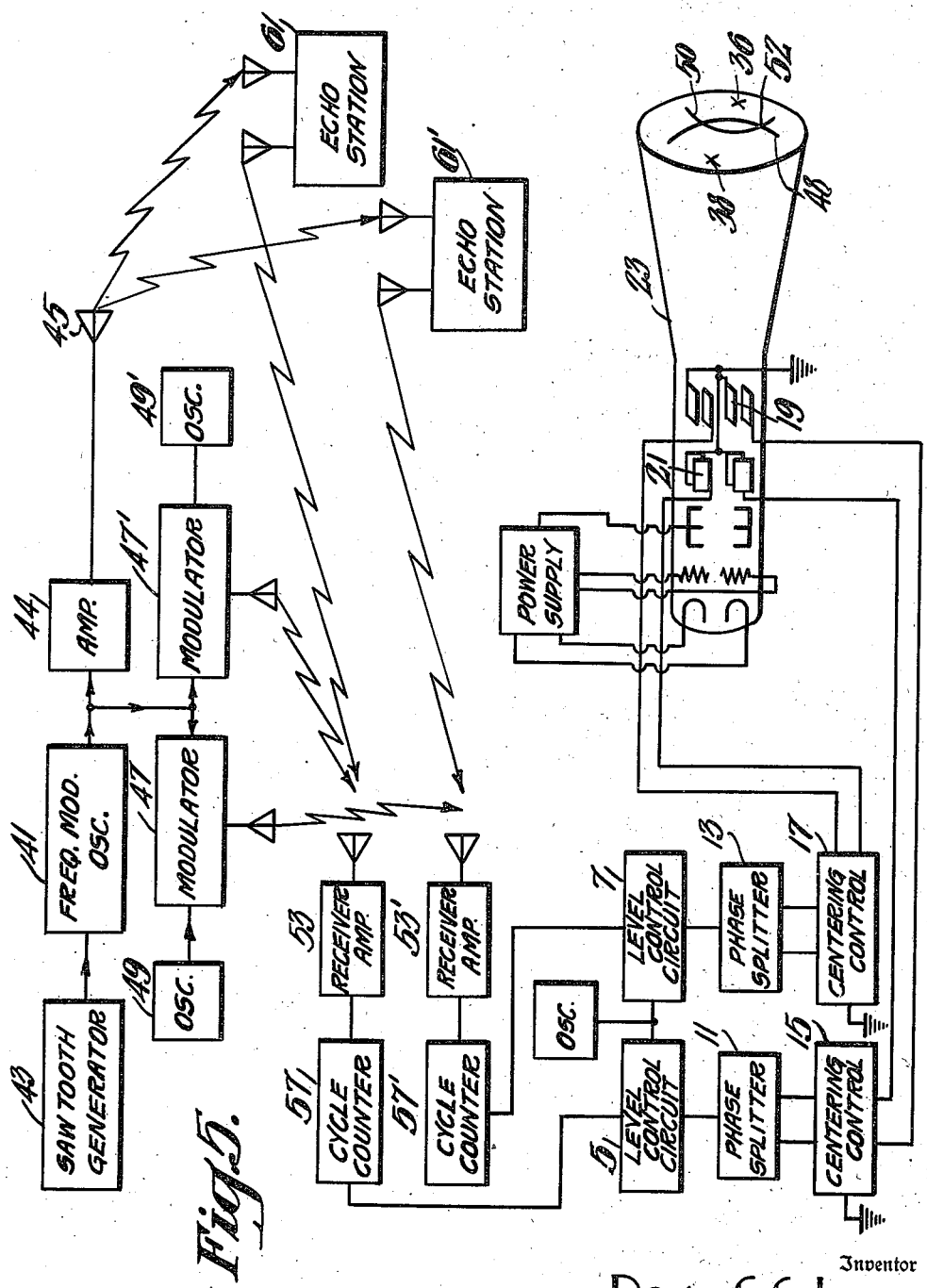

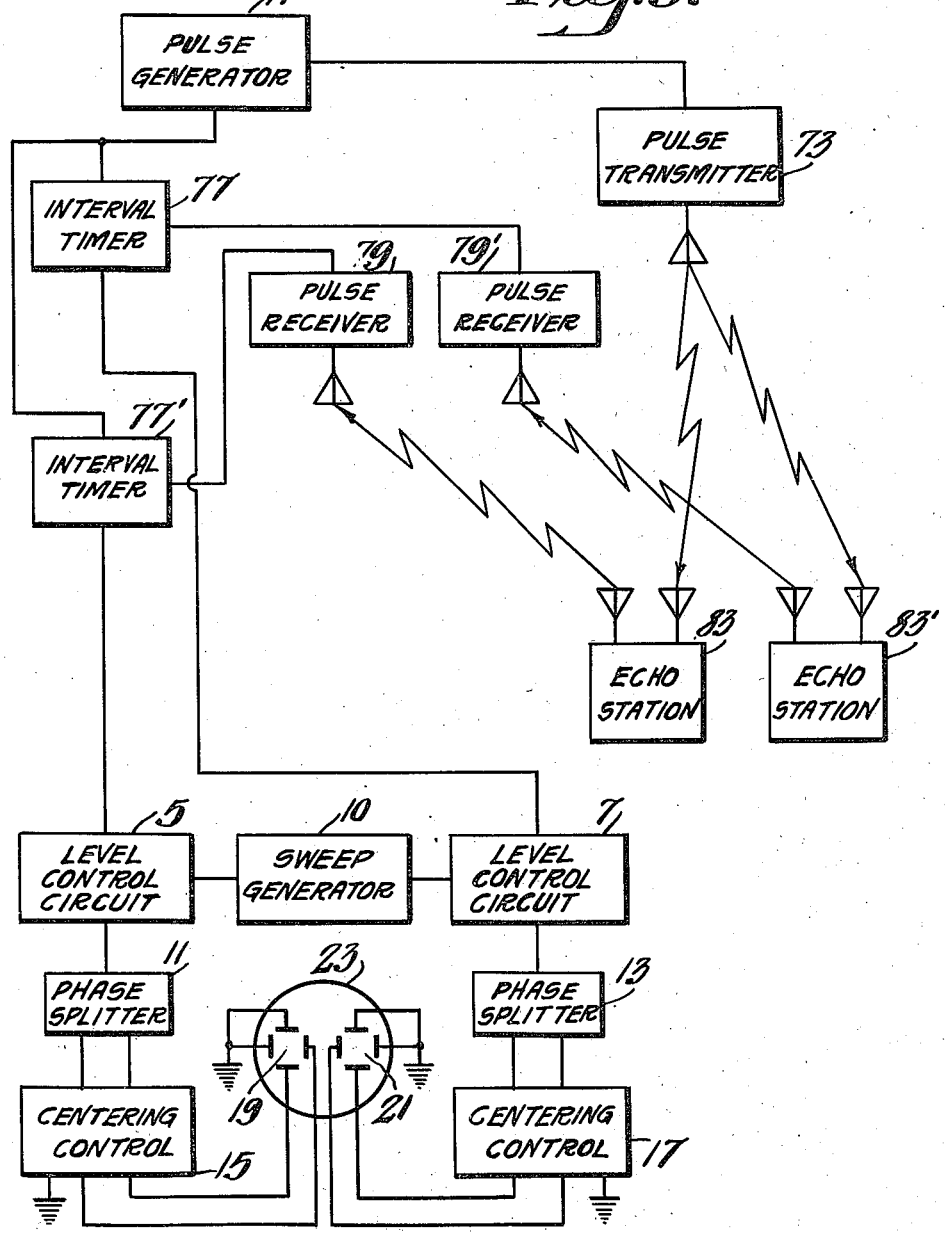

Patented Sept. 9, 1947

2,427,219

UNITED STATES PATENT OFFICE 2,427,219

RADIO POSITION INDICATING SYSTEM

David G. C. Luck, Hightstown, N. J., assignor to Radio Corporation of America, a corporation of Delaware Application November 2, 1942, Serial No. 464,177

4 Claims. (Cl. 250—1.60)

1

This invention relates to radio position finding, and more particularly to systems for indicating the position of a mobile craft with respect to a plurality of fixed stations, using relayed transmissions between the fixed stations and the mobile station. The distance from the mobile station of each of the fixed stations is determined by the time required for a signal to travel from the mobile station to the fixed station, and back to the mobile station. Thus the position of the mobile station may be determined on a map by plotting circles centered at the positions of the fixed stations with radii corresponding to the respective distances.

Figure 2:
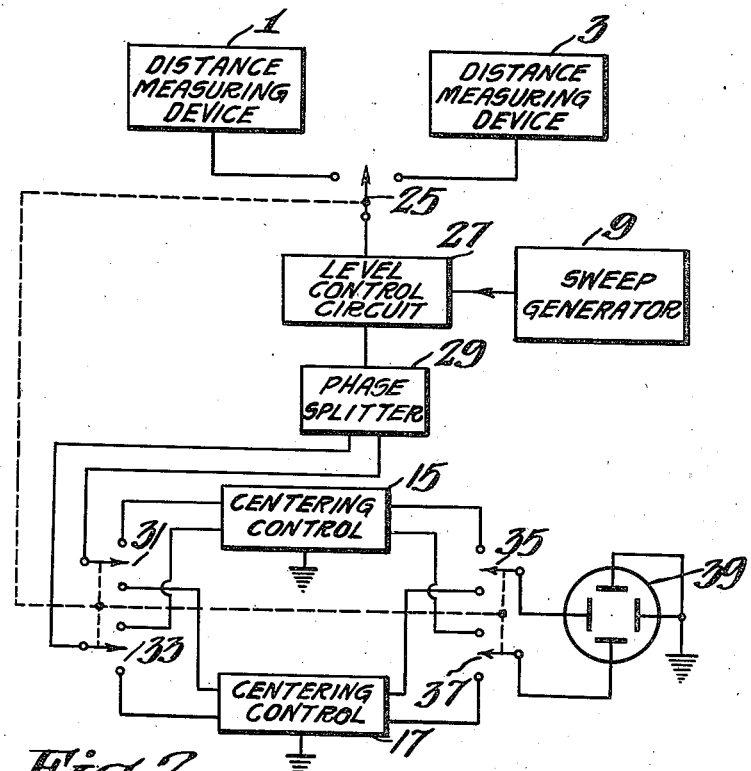
Figure 3:
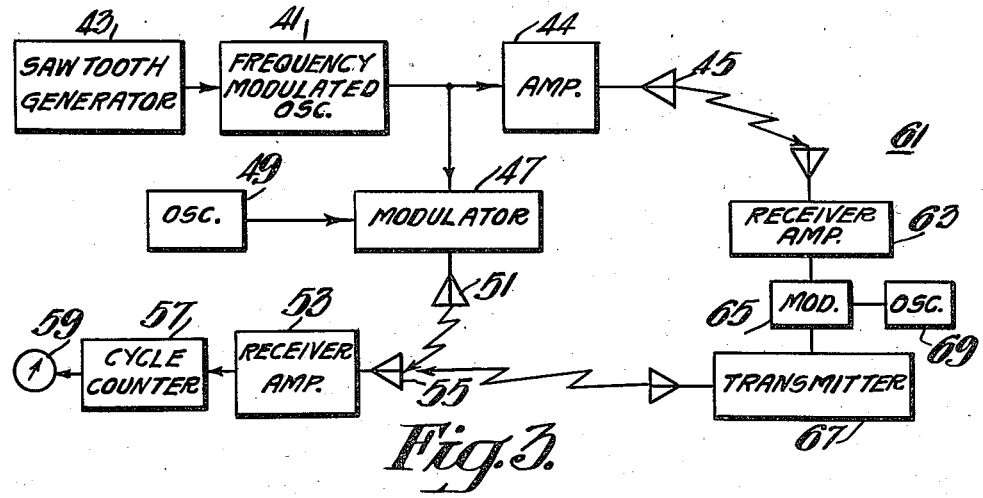
Figure 4:
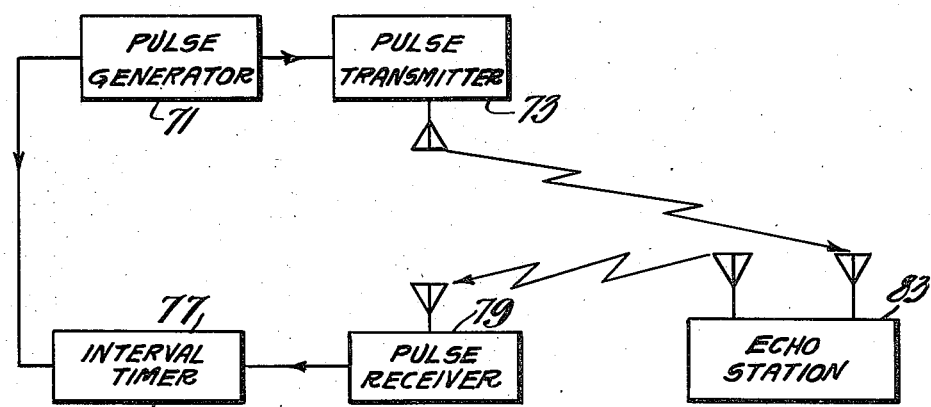
Figure 7:
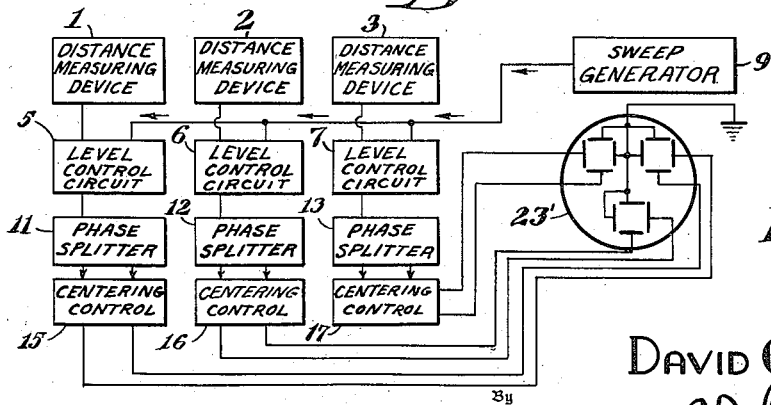

Copending U. S. application, Serial No. 329,434, filed April 13, 1940, by S. W. Seeley, and entitled Position determining systems, describes a system of this type, provided with means for indicating separately the distances of the fixed stations. It is the principal object of the present invention to provide an improved indicator means for such systems. Another object is to provide an improved method of and means for automatically plotting the position of a mobile station upon a map or chart placed over the screen of a cathode ray tube. These and other objects will become apparent to those skilled in the art upon consideration of the following description, with reference to the accompanying drawings of which Fig. 1 is a schematic block diagram of one embodiment of the invention, Fig. 2 is a modification of Fig. 1, Fig. 3 is a block diagram illustrating the arrangement of one type of distance measuring device, Fig. 4 is a diagram of an alternative type of distance measuring device, Fig. 5 is a block diagram of a complete position indicating system, Fig. 6 illustrates a modified system similar to Fig. 5, and Fig. 7 illustrates a modification of the system of Fig. 1.

Figure 1:
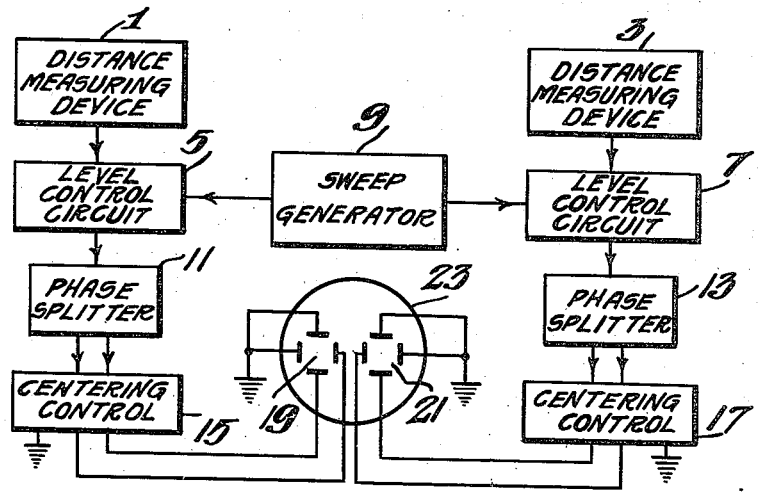

Referring to Fig. 1, the mobile station is provided with a pair of radio distance measuring devices 1 and 3. Each of these devices is arranged as described more fully herein below, to produce a steady unidirectional voltage proportional in magnitude to the distance from the mobile station to a corresponding fixed station. A sweep voltage generator 9 is connected to a pair of level control circuits 5 and 7, which comprise amplifiers arranged to have their gains controlled by the outputs of the devices 1 and 3 respectively. The frequency of the sweep generator 9 is made high enough to avoid flickering of the indications. The outputs of the level controls are applied to phase splitters 11 and 13, which are connected through centering controls 15 and 17 to the deflection systems 19 and 21 of a double gun cathode ray tube 23. The centering controls 15 and 17 comprise adjustable bias circuits arranged to set the undeflected spot of each cathode ray gun at a point on the screen corresponding to the map position of the respective fixed station.

The operation of the system is as follows: The output of the generator 9 is applied to the level control circuits 5 and 7. The gain of each of these circuits is proportional to the distance of the respective fixed station. The phase splitters 11 and 13 provide two-phase voltages for producing circular traces of the cathode ray beams. The radii of the traces are proportional to the outputs of the devices 1 and 3, and hence to the respective distances of the fixed stations. The traces intersect at two points on the screen of the tube 23. The map position of the mobile station is at one of these points.

Usually the operator will have enough additional information, such as his approximate position, or the bearing of one of the ground stations, to enable him to select the correct one of the two intersections. However, if an unambiguous indication is required, a third ground station and mobile receiver may be used, with an additional control channel 2, 6, 12, 16 and a three gun cathode ray tube 23' as illustrated in Fig. 7.

Fig. 2 shows a modification of the system in Fig. 1 which utilizes a single gun cathode ray tube. The distance measuring devices 1 and 3 are connected through a double throw switch 25 to a level control circuit 27 similar to the level control circuits 5 and 7 of Fig. 1. The output of the level control circuit is connected through a phase splitter 29 and through double throw switches 31 and 33 to the centering controls 15 and 17. The outputs of the centering controls are connected through switches 35 and 37 to the horizontal and vertical deflection circuits respectively of a cathode ray tube 39. The switches 25, 31, 33, 35 and 37 are mechanically ganged and operated cyclically together by a motor (not shown) to connect tube 39 through the centering control 15 when the distance measuring device 1 is connected to the level control circuit, and through the centering control 17 when the distance measuring device 3 is connected to the level control. The operation of this system is similar to that of the system of Fig. 1, except for the fact that the time of operation of the tube 39 and the level control 27 is shared between the distance measuring devices at a rate sufficiently rapid to present the appearance of simultaneous traces on the face of the cathode ray tube.

Fig. 3 shows a distance measuring device suitable for use with the system of Fig. 1 and Fig. 2. An oscillator 41 is arranged to be frequency modulated by a sawtooth generator 43. The output of the oscillator 41 is applied through amplifier 44 to an antenna 45. The modulator 47 is connected to the oscillator 41 and to a second oscillator 49. The output of the modulator 47 is coupled to an amplifier 53 by means of antennas 51 and 55, for example, the amplifier 53 is connected to a frequency meter comprising an averaging cycle counter 57 and a direct current meter 59. The cycle counter 57 may be of the type described by F. V. Hunt in the February 1935 issue of the Review of Scientific Instruments, page 43. An echo station 61 is provided at a predetermined reference point from which the distance to the mobile station is to be measured.

The echo station 61 includes a receiver 63 and a transmitter 67. The output circuit of the receiver 63 is connected through a modulator 65 to the transmitter 67. A local oscillator 69 is connected to the modulator 65.

The operation of this system is as follows: The frequency of the oscillator 41 is cyclically varied by the generator 43. This frequency modulated signal is transmitted to the echo station 61, shifted in frequency in the modulator 65 by an amount equal to the frequency of the oscillator 69, and retransmitted at the new frequency by the transmitter 67. The retransmitted signal is picked up by the antenna 55 and applied to the receiver 53. At the same time the modulator 47 and the oscillator 49 shift the frequency of the output of the oscillator 41 by an amount equal to the shift produced at the echo station 61. This signal is radiated from the antenna 51 and picked up by the antenna 55. During the time required for the signal to travel from the antenna 45 to the echo station and return to the antenna 55 the frequency of the oscillator 41 has changed by an amount depending upon the design of the system. Thus the signals received at the antenna 55 from the echo station 61 and the modulator 47 differ in frequency by an amount directly related to the distance from the control station to the echo station. This difference frequency appears in the output of the receiver 53 and actuates the cycle counter 57, causing meter 59 to be deflected correspondingly. This system is described in greater detail in copending application Serial Number 464,178, filed November 2, 1942, by D. G. C. Luck, and entitled Radio position finding.

Fig. 4 shows an alternative system for measuring distances employing pulse signals. A pulse generator 71 is connected to a transmitter 73. The output of the pulse generator 71 is also applied to an interval timer circuit 77, which is connected to the output of a receiver 79. The timer 77 is provided with an indicator comprising a direct current meter 81. The echo station 83 includes a receiver having its output circuit connected to modulate a transmitter.

The operation of this system is as follows: The pulse generator 71 provides a train of sharp impulses which is radiated from the transmitter 73. This signal is picked up at the echo station 83 and immediately retransmitted, arriving at the pulse receiver 79 with a delay proportional to the distance of the control station from the echo station. The interval timer 77 comprises a tube which is keyed on by the pulses from the generator 71 and off by the pulses from the receiver 79 respectively, and provides rectangular waves with widths proportional to the delay time. These rectangular waves are integrated by the inertia of the meter 81, and may be passed through a filter if necessary to provide a steady deflection of the meter.

The above described system may be adapted for use with cathode ray indicators of the type illustrated in Figs. 1 and 2 by connecting the output of the interval timer 77 to the level control circuit. Similarly the system in Fig. 3 may be used with a cathode ray position plotting means. This arrangement is illustrated in Fig. 5. The control station comprises a frequency modulated oscillator 41, sawtooth generator 43, amplifier 44, antenna 45, modulator 47, local oscillator 49, receiver 53 and cycle counter 57, identical with the correspondingly designated elements of Fig. 3. A second channel is provided comprising a modulator 47', oscillator 49', receiver 53' and cycle counter 57'. This channel is identical with the first except that the oscillator 49' operates at a different frequency from that of the oscillator 49. Two echo stations 61 and 61' are provided, similar to the echo station 61 of Fig. 3 with the exception that the oscillator of 61' operates at a different frequency, corresponding to the frequency of the oscillator 49'. The indicator system is identical with that shown in Fig. 1, with corresponding elements designated similarly. The outputs of the cycle counters 57 and 57' are connected to the level controls 5 and 7 respectively. Each channel of the distance measuring system operates in the same manner as the system of Fig. 3, controlling the indicator system as described in connection with Fig. 1. The centering controls 15 and 17 are adjusted to cause the cathode ray beams to sweep about points 36 and 38, corresponding to the map positions of the echo stations 61 and 61'. The circular traces 48 and 50 are produced with radii corresponding to the distance of the respective echo stations from the control stations. The traces intersect in the two points, one of which corresponds to the map position 52 of the control station, as described in connection with Fig 1.

Fig. 6 shows an arrangement similar to that illustrated in Fig. 5 using two channels similar to the pulse system shown in Fig. 4. The operation of the distance measuring device and the indicator have been described above in connection with Figs. 1 and 4.

Thus the invention has been described as an improved position indicator system for travel time distance measuring systems. Circular traces are produced on the face of a cathode ray tube, centered at positions corresponding to the known locations of ground stations, and having radii corresponding to the distances of the respective ground stations from a mobile station. One point of intersection of the circular traces then corresponds to the position of the mobile station.

I claim as my invention:

1. The method of plotting on the screen of a cathode ray tube the position of a mobile station in terms of its distances from a plurality of fixed stations, comprising the steps of transmitting signals from said mobile station to each of said fixed stations, transmitting in response to said signals from each of said fixed stations signals to said mobile station, comparing the signals received at said mobile station with the signals transmitted therefrom to derive a plurality of control voltages, corresponding respectively to the distance of said mobile station from said fixed stations, producing a plurality of substantially circular cathode ray scanning patterns centered at points spatially corresponding respectively to the positions of said fixed stations, and controlling the radius of each of said scanning patterns in response to a respective one of said control voltages.

2. A position indicating system including a plurality of fixed stations, a mobile station comprising a plurality of radio distance measuring devices, each including means for producing a control voltage proportional in magnitude to the distance of a respective one of said fixed stations from said mobile station; a cathode ray tube including deflection circuits, a local oscillator and phase splitter means for producing circular scanning patterns on the screen of said tube, bias means for centering each of said patterns respectively at a point corresponding to the map position of one of said fixed stations, and variable gain amplifier means connected in the deflection circuits of said cathode ray tube and each responsive to the respective control voltage of one of said radio distance measuring devices to adjust the radius of each of said scanning patterns in proportion to the corresponding control voltage and thus to the distance of the corresponding fixed station from said mobile station.

3. The system as claimed in claim 2 wherein each of said radio distance measuring devices comprises a source of cyclically recurrent pulses, a receiver, a transmitter connected to said source, a relay station at one of said fixed stations arranged to respond to said transmitter and retransmit said pulses to said receiver, and an interval timer circuit comprising a tube connected to be keyed on by the pulses from said source and keyed off by the pulses from said receiver.

4. The system as claimed in claim 2 wherein each of said radio distance measuring devices comprises a receiver, a source of frequency modulated radio frequency signal energy, a transmitter connected to said source, a relay station at each of said fixed stations arranged to respond to said transmitter and retransmit said signal to said receiver, means for applying said initial signal to said receiver, and beat frequency responsive means connected to the output of said receiver.

DAVID G. C. LUCK.

REFERENCES CITED

The following references are of record in the file of this patent:

UNITED STATES PATENTS

| Number | Name | Date |
|---|---|---|
| 2,312,761 | Hershberger | Mar. 2, 1943 |
| 2,234,023 | Cockerell | Mar. 4, 1941 |
| 2,183,634 | Zworykin | Dec. 19, 1939 |
| 2,178,074 | Jakel et al. | Oct. 31, 1939 |
| 1,750,668 | Green | Mar. 18, 1930 |
| 2,301,929 | Budenbom | Nov. 17, 1942 |
| 2,134,716 | Gunn | Nov. 1, 1938 |
| 2,209,191 | Dearing | July 23, 1940 |

FOREIGN PATENTS

| Number | Country | Date |
|---|---|---|
| 503,471 | Great Britain | Apr. 6, 1939 |